(12) United States Patent
Sobka, Jr. et al.

(10) Patent No.: US 11,976,734 B2
(45) Date of Patent: May 7, 2024

(54) PROPORTIONAL FLOW CONTROL VALVE

(71) Applicant: MAC Valves, Inc., Wixom, MI (US)

(72) Inventors: David M. Sobka, Jr., Plymouth, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 18/082,832

(22) Filed: Dec. 16, 2022

(65) Prior Publication Data

US 2023/0204110 A1 Jun. 29, 2023

Related U.S. Application Data

(60) Provisional application No. 63/294,240, filed on Dec. 28, 2021.

(51) Int. Cl.
*F16K 11/044* (2006.01)
*F16K 1/08* (2006.01)
(Continued)

(52) U.S. Cl.
CPC .............. *F16K 11/044* (2013.01); *F16K 1/08* (2013.01); *F16K 27/0263* (2013.01);
(Continued)

(58) Field of Classification Search
CPC ........... F16K 11/044; Y10T 137/86622; Y10T 137/8671; Y10T 137/86879; Y10T 137/86895
See application file for complete search history.

(56) References Cited

U.S. PATENT DOCUMENTS 5,318,272 A 6/1994 Smith
6,488,050 B1 * 12/2002 Jabcon .................. F16K 11/044
137/625.65
(Continued)

FOREIGN PATENT DOCUMENTS

DE 9218213 U1 9/1993
DE 102008005274 A1 8/2008
(Continued)

OTHER PUBLICATIONS

Search Report for Application No. GB2219544.0 filed Jun. 21, 2023.
(Continued)

*Primary Examiner* — Robert K Arundale
(74) *Attorney, Agent, or Firm* — Harness, Dickey & Pierce, P.L.C.

(57) ABSTRACT

A valve apparatus that includes a valve assembly including a valve retainer body that houses a movable poppet that defines a valve member that is configured to contact a conically shaped valve seat of the valve retainer body; and a motor assembly including a rotatable shaft that is configured to actuate the valve assembly; wherein the rotatable shaft includes a thread formed at an end thereof, the thread being engaged with a sleeve that through rotation of the thread by the rotatable shaft will translate the sleeve towards and away from the movable poppet to transfer an axial force to the poppet that forces the valve member into engagement and disengagement with the valve seat to open and close the valve assembly.

16 Claims, 2 Drawing Sheets

Figure 1:
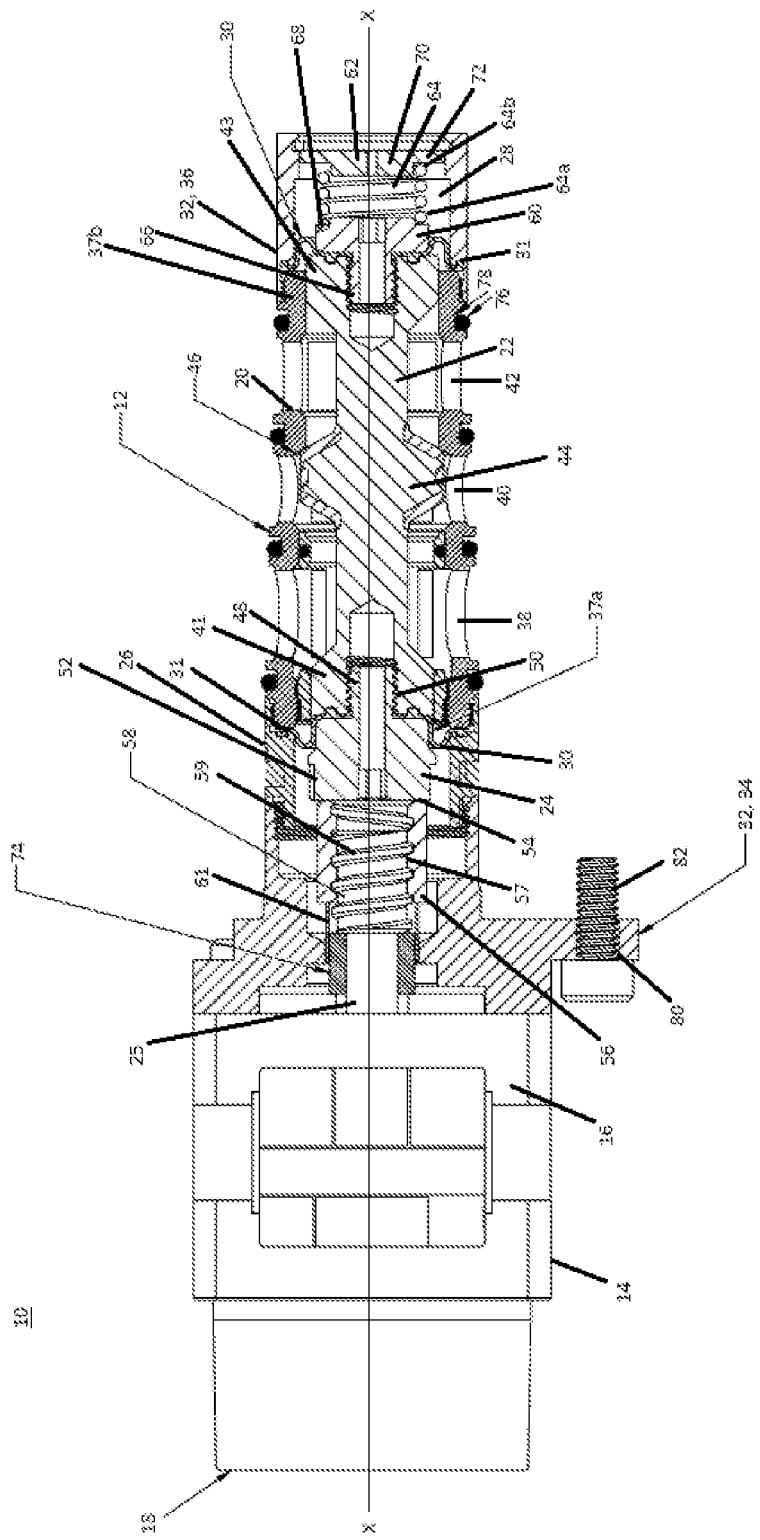

(51) Int. Cl.
*F16K 1/36* (2006.01)
*F16K 27/02* (2006.01)
*F16K 31/04* (2006.01)
*F16K 31/06* (2006.01)
*F16K 31/50* (2006.01)

(52) U.S. Cl.
CPC ............ *F16K 31/047* (2013.01); *F16K 31/50* (2013.01); *F16K 1/36* (2013.01); *F16K 31/0627* (2013.01); *Y10T 137/86622* (2015.04)

(56) References Cited

U.S. PATENT DOCUMENTS

| | | | | |
|---|---|---|---|---|
| 7,523,763 | B2* | 4/2009 | Katsuta | F16K 31/0627 251/282 |
| 2006/0027269 | A1* | 2/2006 | Neff | H01F 7/1607 137/625.65 |
| 2006/0065315 | A1* | 3/2006 | Neff | F16K 11/044 137/625.65 |
| 2007/0176720 | A1* | 8/2007 | Janssen | H01F 7/1607 335/270 |
| 2012/0012768 | A1* | 1/2012 | Yahr | F16K 11/065 251/129.11 |
| 2020/0240536 | A1 | 7/2020 | Williams et al. | |
| 2021/0254752 | A1 | 8/2021 | Ando et al. | |

FOREIGN PATENT DOCUMENTS

| | | |
|---|---|---|
| EP | 3045788 A1 | 7/2016 |
| EP | 3686466 A1 | 7/2020 |
| GB | 2587945 A | 4/2021 |

OTHER PUBLICATIONS

Extended European Search Report dated May 30, 2023, relative to corresponding European Patent Application No. 22216453.5.

* cited by examiner

PROPORTIONAL FLOW CONTROL VALVE

CROSS-REFERENCE TO RELATED APPLICATIONS

This application claims the benefit of U.S. Provisional Application No. 63/294,240, filed on Dec. 28, 2021. The entire disclosure of the above application is incorporated herein by reference.

FIELD

The present disclosure relates to a proportional flow control valve.

BACKGROUND

This section provides background information related to the present disclosure which is not necessarily prior art.

Valves with proportional control provide increased control over the amount of fluid that can pass through the valve. This can be particularly important where a specific amount of fluid is required for a specific application such as, for example, a medical procedure or treatment. In this regard, if the correct amount of the fluid is not provided during the procedure or treatment, the efficacy of the procedure or treatment may be reduced. Other applications that may require proportional control including providing a correct amount of carbonation to a beverage, providing fluid pressure control to a mobility assist unit, and applications that require fluid dosing.

SUMMARY

This section provides a general summary of the disclosure and is not a comprehensive disclosure of its full scope or all of its features.

According to a first aspect of the present disclosure there is provided a valve apparatus that includes a valve assembly including a valve retainer body that houses a movable poppet that defines a valve member that is configured to contact a valve seat of the valve retainer body; and a motor assembly including a rotatable shaft that is configured to actuate the valve assembly; wherein the rotatable shaft includes a thread formed at an end thereof, the thread being engaged with a sleeve that through rotation of the thread by the rotatable shaft will translate the sleeve towards and away from the movable poppet to transfer an axial force to the poppet that forces the valve member into engagement and disengagement with the valve seat to open and close the valve assembly.

According to the first aspect, the valve apparatus may also include a spring assembly for biasing the valve member away from the valve seat.

According to the first aspect, the valve retainer body includes a first inlet, a second inlet, and an outlet, wherein the first inlet is configured to be in fluid communication with a first fluid and the second inlet is configured to be in fluid communication with a second fluid.

According to the first aspect, the first and second fluids intermix when the valve assembly is open.

According to the first aspect, the first fluid includes a gas and the second fluid includes a liquid.

According to the first aspect, the first fluid and the second fluid each include either a liquid or a gas.

According to the first aspect, the thread is configured such that a single 360-degree rotation of the thread of the rotatable shaft will fully open the valve assembly.

According to the first aspect, the valve apparatus may also include a cylindrical spacer surrounding the rotatable shaft between the thread and the motor assembly.

According to the first aspect, the thread of the rotatable shaft mates with a corresponding threaded surface of the sleeve, and the sleeve includes a cylindrical extension that slidingly engages the cylindrical spacer.

According to the first aspect, the valve apparatus may also include a sealing diaphragm between the poppet and the thread of the rotatable shaft, wherein a diameter of the sealing diaphragm being substantially equal to a diameter of the valve retainer body.

According to a second aspect of the present disclosure, there is provided a valve apparatus that may include a valve retainer body defining a valve seat; a movable poppet that defines a valve member that is configured to contact the valve seat of the valve retainer body; a rotatable shaft that is configured to actuate the movable poppet; a thread formed at an end of the rotatable shaft; a sealing diaphragm between the movable poppet and the rotatable shaft; and a sleeve engaged with the thread of the rotatable shaft, wherein rotation of the thread by the rotatable shaft translates the sleeve towards and away from the movable poppet to transfer an axial force to the poppet that forces the valve member into engagement and disengagement with the valve seat to open and close the valve assembly.

According to the second aspect, the sleeve includes an internally threaded surface that is engaged with the thread of the rotatable shaft.

According to the second aspect, the sleeve includes an abutment surface configured to contact the poppet and transmit the axial force to the poppet.

According to the second aspect, the valve apparatus may also include a cylindrical spacer surrounding the rotatable shaft at an end of the rotatable shaft that does not include the thread.

According to the second aspect, the sleeve includes a first portion configured to be mated with the thread of the rotatable shaft and an axially extending cylindrical portion that is configured to slide along the spacer.

According to the second aspect, the valve retainer body includes a first inlet, a second inlet, and an outlet, wherein the first inlet is configured to be in fluid communication with a first fluid and the second inlet is configured to be in fluid communication with a second fluid.

According to the second aspect, the first inlet is located on a first side of the valve member and the second inlet is located on a second side of the valve member, the outlet is located between the first inlet and the second inlet, and the first and second fluids intermix when the valve assembly is open.

According to the second aspect, the first fluid and the second fluid each include either a liquid or a gas.

According to the second aspect, a diameter of the sealing diaphragm is substantially equal to a diameter of the valve retainer body.

According to the second aspect, the valve apparatus may also include a motor for rotating the rotatable shaft and the thread of the rotatable shaft to translate the sleeve towards and away from the movable poppet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
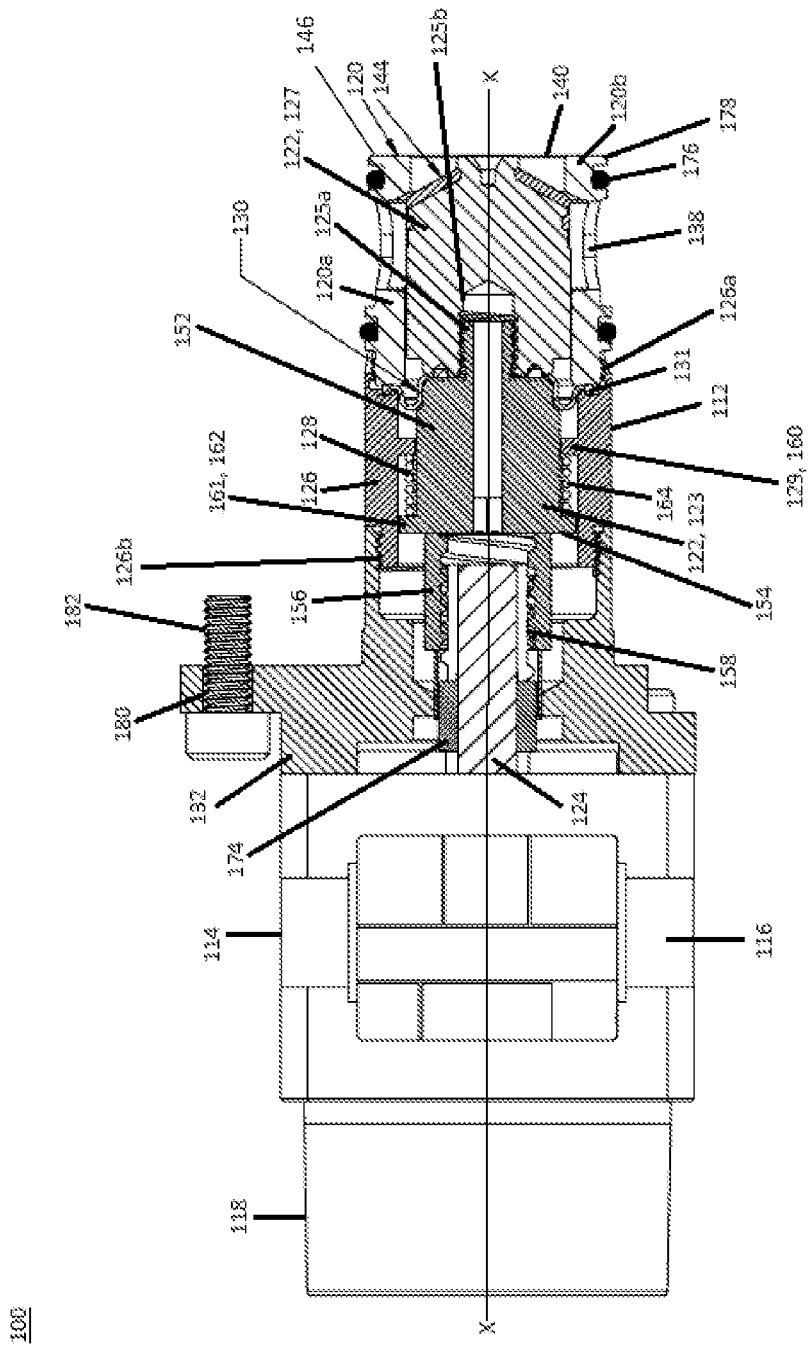

FIG. 1 is a cross-sectional view of a first proportional control valve according to a principle of the present disclosure; and FIG. 2 is a cross-sectional view of a second proportional control valve according to a principle of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, operations, elements, and/or components, but do not preclude the presence or addition of one or more other features, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements or components, these elements or components should not be limited by these terms. These terms may be only used to distinguish one element or component from another. Terms such as "first," "second," and other numerical terms when used herein do not imply a sequence or order unless clearly indicated by the context. Thus, a first element or component could be termed a second element or component without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a first proportional control valve apparatus 10 according to the present disclosure. Valve apparatus 10 is configured to proportionally control a flow of fluid, including liquids and gases. In the illustrated embodiment, valve apparatus 10 is a three-way valve that is configured to permit two fluids to enter the valve apparatus 10 and intermix with each other before exiting the valve apparatus 10. The two fluids may be the same or different, and it is contemplated that one fluid may be a liquid and the other fluid may be a gas.

First valve apparatus 10 includes a valve assembly 12 and a motor assembly 14 that is configured to actuate the valve assembly 12. Motor assembly 14 may include a stepper motor (not shown) housed in a motor housing 16 and an encoder 18. Encoder 18 is configured to provide positional feedback and indexing. By using an index, the valve apparatus 10 may be configured to fully open and close digitally.

Valve assembly 12 includes a valve retainer body 20, poppet 22, a coupling member 24 that contacts poppet 22 to a shaft 25 of motor assembly 14, a connector bushing 26, a spring assembly 28, and a pair of sealing diaphragms 30. Valve assembly 12 also includes a valve housing assembly 32 including a first housing 34 that connects the valve assembly 12 to motor assembly 14 and a second housing 36 that houses spring assembly 28.

Valve retainer body 20 may be formed of a rigid material such as a metal material or a polymeric material. Valve retainer body 20 includes a first end 37a configured to be coupled to connector bushing 26 and a second end 37b configured to be coupled to second housing 36. Connector bushing 26 and second housing 36 may be threadingly coupled to first and second ends 37a and 37b, respectively, of valve retainer body 20. One of the sealing diaphragms 30 is positioned between first end 37a of the valve retainer body 20 and the connector bushing 26, and another of the sealing diaphragms 30 is positioned between the second end 37b of valve retainer body 20 and the second housing 36. Sealing diaphragms 30 are used to balance the poppet 22 under pressure. Diaphragms 30 may include an annular rib 31 that improves sealing of the inner and outer diameter of diaphragm 30. In this regard, for example, when the diaphragm 30 is positioned between first end 37a of the valve retainer body 20 and the connector bushing 26 and these components are threaded together, the rib 31 is configured to compress to increase the sealing capability. A similar action occurs when diaphragm 30 is positioned between the second end 37b of valve retainer body 20 and the second housing 36 and these components are threaded together. In addition, the compression of rib 31 assists in compensating for manufacturing tolerances of the components that sandwich the diaphragms 30.

Valve retainer body 20 includes a first inlet aperture or port 38 configured for fluid communication with a first fluid source (not shown), a second inlet aperture or port 42 configured for fluid communication with a second fluid source (not shown), and an outlet aperture or port 40.

Poppet 22 is movably received within valve retainer body 20. Similar to valve retainer body 20, poppet 22 can be formed of a rigid material such as a metal material or a polymeric material. Poppet 22 includes a proximate end 41 configured to be connected to coupling member 24 and a distal end 43 configured to be connected to spring assembly 28. A valve member 44 is located between the proximate and distal ends 41, 43 of poppet 22 at second port 30. As poppet 22 is translated back and forth along axis X of valve assembly 12 to open and close the valve assembly 12, valve member 44 is configured to contact a valve seat 46 of valve retainer body 20, which is conically shaped to improve flow and pressure drop. When valve member 44 is in contact with valve seat 46, valve assembly 12 is closed (as shown in FIG. 1), and when valve member 44 is moved away from valve seat 46, valve assembly 12 is open (not shown). When valve assembly 12 is open, fluid that enters first inlet port 38 and second inlet port 42 are permitted to flow past valve member 44, intermix, and then exit valve assembly 12 through outlet aperture 40.

Connector bushing 26 connects first end 37a of valve retainer body 20 to first housing 34. Connector bushing 26 may be formed of a rigid material such as a metal material or a polymeric material. Connector bushing 26 includes an exterior threaded surface for connection to valve retainer body 20 and an interior threaded surface for connection to first housing 34.

Poppet 22 is configured to be actuated by an axially translatable sleeve 56 that is driven by shaft 25 of motor assembly 14. More particularly, poppet 22 is connected to shaft 25 via coupling member 24 and sleeve 56. Coupling member 24 includes a threaded projection 48 that is threadingly engaged with a threaded recess 50 of poppet 22. A cylindrical main body 52 of coupling member 24 includes an abutment surface 54 that is configured to abut against sleeve 56 that surrounds a thread 58 that is part of shaft 25. As shaft 25 and thread 58 rotate, sleeve 56 can be moved toward and away from coupling member 24. When sleeve 56 contacts coupling member 24 and exerts a force against abutment surface 54, coupling member 24 will transmit this force to poppet 22 to force valve member 44 into engagement with valve seat 46. When sleeve 56 is moved away from coupling member 24, a counterforce exerted by spring assembly 28 will bias valve member 44 of poppet 22 away from valve seat 46 to open the valve assembly 12.

Thread 58 can be specifically designed and customized to control movement of valve member 44 to customize the proportional flow permitted to pass through valve assembly 12. In the illustrated embodiment, thread 58 is designed to permit a 2.5 mm valve stroke (i.e., valve assembly 12 is fully open) with a single 360 degrees rotation of thread 58. Valve strokes less than 2.5 mm are permitted by controlling the amount of rotation of thread 58. In this manner, by controlling the amount of rotation of thread 58, the flow through valve assembly 12 can be tightly controlled rather than fully opening and closing the valve assembly 12. It should be understood that the 2.5 mm valve stroke is merely an example, and that different valve strokes can be obtained by modifying the pitches between the ridges 59 of the thread 58.

Spring assembly 28 includes a first spring seat 60 attached to second end 37b of valve retainer body 20 and a second spring seat 62 coupled to an interior surface of second housing 36, with a coil spring 64 being positioned between first spring seat 60 and second spring seat 62. First spring seat 60 includes a threaded extension 66 coupled to second end 37b of valve retainer body 20 and an annular shoulder 68 that is configured to support a first end 64a of the spring 64. Second spring seat 62 includes a cylindrical projection 70 that is surrounded by an annular surface 72, with a second end 64b of the spring 64 surrounding the cylindrical projection 70 and being supported by the annular surface 72.

As noted above, rotation of shaft 25 and thread 58 can control the amount that valve assembly 12 is permitted to open. In addition, as noted above, spring assembly 28 is configured to bias valve member 44 of poppet 22 away from valve seat 46. As shaft 25 and thread 58 rotate and move poppet 22, spring 64 will compress and permit poppet 22 to move along axis X. Shaft spacer 74 is a hollow cylindrical member including an axial length that can be specifically selected and tailored to limit shaft movement along the axis X due to a spring (not illustrated) that is located within motor assembly 14. Sleeve 56 includes an interior threaded surface 57 configured to mate with thread 58 and an axially extending cylindrical section 61 that is configured to slide along an opening formed in housing assembly 32 that includes a pair of parallel flats that prevent sleeve 56 from rotating and permit sleeve 56 to move forward and backward as the shaft 25 rotates.

Valve assembly 12 may also include a plurality of sealing members or O-rings 76 positioned about an exterior of valve retainer body 20. Specifically, sealing members 76 are positioned within recesses 78 positioned above valve retainer body 20. The depth of recesses 78 and cross-sectional diameters of sealing members 76 may be specifically designed and tailored to permit valve assembly 12 to be inserted into a manifold (not shown) in a manner that does not damage sealing member 76. In this regard, conventional valve apparatuses are typically threaded (i.e., rotated) to mate with a bore (not shown) of the manifold (not shown), which could damage the sealing members during this connection process. Moreover, when unthreading the conventional valve apparatus form the bore, the rotation could separate the motor assembly from the valve assembly and leave the valve assembly in the bore, which would then require additional work to remove the valve assembly from the bore. With the illustrated configuration, the valve apparatus 10 may be inserted into the bore of the manifold without rotating the valve apparatus to ensure a fluid-tight connection. Then to ensure that valve apparatus 10 remains seated with the manifold, the first housing 34 includes an aperture 80 configured for receipt of a fastener 82 that can fix the valve apparatus 10 to the manifold.

Now referring to FIG. 2, a second proportional control valve apparatus 100 will be described. Valve apparatus 100 is similar to valve apparatus 10 described above. In this regard, second valve apparatus 100 includes a valve assembly 112 and a motor assembly 114 that is configured to actuate the valve assembly 112. Motor assembly 114 may include a stepper motor (not shown) housed in a motor housing 116 and an encoder 118 that is configured to provide positional feedback and indexing.

Valve assembly 112 includes a valve retainer body 120, a two-piece poppet 122 connected to a shaft 124 of motor assembly 114, a connector bushing 126, a spring assembly 128, and a single sealing diaphragm 30. Valve assembly 112 also includes a valve housing assembly 132 that connects the valve assembly 112 to motor assembly 114.

Valve retainer body 120 may be formed of a rigid material such as a metal material or a polymeric material. Valve retainer body 120 includes a first end 120a configured to be coupled to connector bushing 126 and a second open end 120b that defines an outlet of the valve assembly 112. Connector bushing 126 may be threadingly coupled to first end 120a of valve retainer body 120. Sealing diaphragm 130 is positioned between first end 120a of the valve retainer body 120 and the connector bushing 126. Sealing diaphragm 130 is used to balance the poppet 122 under pressure. Diaphragm 130 may include an annular rib 131 that improves sealing of the inner and outer diameter of valve retainer body 120.

Valve retainer body 120 includes an inlet port 138 configured for fluid communication with a first fluid source (not shown). As noted above, second open end 120b of valve retainer body 120 defines a fluid outlet 140 of valve assembly 112.

Poppet 122 is movably received within connector bushing 126 and valve retainer body 120. Poppet 122 can be formed of a rigid material such as a metal material or a polymeric material. Poppet 122 includes a proximate end 123 within connector bushing 126 and a distal end 127 within valve retainer body 120. Proximate end 123 of poppet 122 includes a threaded projection 125a that is received within a correspondingly threaded recess 125b of distal end 127 to fix proximate end 123 to distal end 127. Diaphragm 130 is sandwiched between proximate end 123 and distal end 127 of poppet 122. Distal end 127 defines a valve member 144. As poppet 122 is translated back and forth along axis X of valve assembly 112 to open and close the valve assembly 112, valve member 144 is configured to contact a valve seat 146 of valve retainer body 120, which is conically shaped to improve flow and pressure drop. When valve member 144 is in contact with valve seat 146, valve assembly 112 is closed (as shown in FIG. 2), and when valve member 144 is moved away from valve seat 146, valve assembly 112 is open (not shown). When valve assembly 112 is open, fluid that enters inlet port 138 is permitted to flow past valve member 144 and then exit valve assembly 112 through outlet 140.

Connector bushing 126 connects first end 120a of valve retainer body 120 to housing 132. Connector bushing 126 may be formed of a rigid material such as a metal material or a polymeric material. Connector bushing 126 includes an interior threaded surface 126a for connection to valve retainer body 120 and an exterior threaded surface 126b for connection to housing 132. A radially inwardly extending ridge 129 extends toward poppet 122.

Proximate end 123 of poppet 122 is configured to be actuated by shaft 124 of motor assembly 114. More particularly, proximate end 123 of poppet 122 defines cylindrical main body 152 having an abutment surface 154 that is configured to abut against an axially translatable threaded sleeve 156 that surrounds a thread 158 that is part of shaft 124. As shaft 124 and thread 158 rotate, sleeve 156 can be moved toward and away from abutment surface 154. When sleeve 156 contacts abutment surface 154, sleeve 156 will transmit a force to poppet 122 to force valve member 144 into engagement with valve seat 146. When sleeve 156 is moved away from abutment surface 154, a counterforce exerted by spring assembly 128 will bias valve member 144 of poppet 122 away from valve seat 146 to open the valve assembly 112.

Thread 158 can be specifically designed and customized to control movement of valve member 144 to customize the proportional flow permitted to pass through valve assembly 112. In the illustrated embodiment, thread 158 is designed to permit a 2.5 mm valve stroke (i.e., valve assembly 112 is fully open) with a single 360 degrees rotation of thread 158. Valve strokes less than 2.5 mm are permitted by controlling the amount of rotation of thread 158. In this manner, by controlling the amount of rotation of tread 158, the flow through valve assembly 112 can be tightly controlled rather than fully opening and closing the valve assembly 112.

Radially inwardly extending ridge 129 that extends toward poppet 122 defines a first spring seat 160 and a radially outwardly extending shoulder 161 of proximate end 123 of poppet 122 defines a second spring seat 162, with a coil spring 164 being positioned between first spring seat 160 and second spring seat 162.

As noted above, rotation of shaft 124 and thread 158 can control the amount that valve assembly 112 is permitted to open. In addition, as noted above, spring assembly 128 is configured to bias valve member 144 of poppet 122 away from valve seat 146. As shaft 124 and thread 158 rotate and move poppet 122, spring 164 will compress and permit poppet 122 to move along axis X. Shaft spacer 174 is a hollow cylindrical member including an axial length that can be specifically selected and tailored to limit shaft movement along the axis X due to a spring (not illustrated) that is located within motor assembly 114.

Valve assembly 112 may also include a plurality of sealing members or O-rings 176 positioned about an exterior of valve retainer body 120. Specifically, sealing members 176 are positioned within recesses 178 positioned above valve retainer body 120. The depth of recesses 178 and cross-sectional diameters of sealing members 176 may be specifically designed and tailored to permit valve assembly 112 to be inserted into a manifold (not shown) in a manner that does not damage sealing member 176. In this regard, conventional valve apparatuses are typically threaded (i.e., rotated) to mate with a bore (not shown) of the manifold (not shown), which could damage the sealing members during this connection process. Moreover, when unthreading the conventional valve apparatus form the bore, the rotation could separate the motor assembly from the valve assembly and leave the valve assembly in the bore, which would then require additional work to remove the valve assembly from the bore. With the illustrated configuration, the valve apparatus 100 may be inserted into the bore of the manifold without rotating the valve apparatus to ensure a fluid-tight connection. Then to ensure that valve apparatus 100 remains seated with the manifold, the housing 132 includes an aperture 180 configured for receipt of a fastener 182 that can fix the valve apparatus 100 to the manifold.

Lastly, it should be noted that each of the valve assemblies 12 and 112 provide a balanced design during use thereof. The valve assemblies 12 and 112 are balanced because the valve retainer bodies 20 and 120, respectively, each have a diameter that is substantially the same as the effective sealing diameter of the diaphragms 30 and 130, respectively. By making the diameter of the valve retainer bodies 20 and 120 substantially the same as the effective sealing diameter of the diaphragms 30 and 130, respectively, pressure fluctuations experienced by valve assemblies 12 and 112 can become more balanced during operation of valve assemblies 12 and 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve apparatus, comprising:
a valve assembly including a valve retainer body that houses a movable poppet that defines a valve member that is configured to contact a valve seat of the valve retainer body; and
a motor assembly including a rotatable shaft that is configured to actuate the valve assembly;
wherein the rotatable shaft includes a thread formed at an end thereof, the thread of the rotating shaft being engaged with a corresponding threaded surface of an axially translatable sleeve including a cylindrical extension that through rotation of the thread by the rotatable shaft will axially translate the sleeve towards and away from the movable poppet to transfer an axial force to the poppet that forces the valve member into engagement and disengagement with the valve seat to open and close the valve assembly, and
wherein a cylindrical spacer surrounds the rotatable shaft at an end of the rotatable shaft that does not include the thread, the cylindrical spacer being located between the thread and the motor assembly and having an axial length that is configured to limit axial movement of the rotatable shaft.

2. The valve apparatus according to claim 1, further comprising a spring assembly for biasing the valve member away from the valve seat.

3. The valve apparatus according to claim 1, wherein the valve retainer body includes a first inlet, a second inlet, and an outlet, the first inlet being configured to be in fluid communication with a first fluid and the second inlet being configured to be in fluid communication with a second fluid.

4. The valve apparatus according to claim 3, wherein the first and second fluids intermix when the valve assembly is open.

5. The valve apparatus according to claim 4, wherein the first fluid includes a gas and the second fluid includes a liquid.

6. The valve apparatus according to claim 4, wherein the first fluid and the second fluid each include either a liquid or a gas.

7. The valve apparatus according to claim 1, wherein the thread is configured such that a single 360-degree rotation of the thread will fully open the valve assembly.

8. The valve apparatus according to claim 1, further comprising a sealing diaphragm between the poppet and the thread, a diameter of the sealing diaphragm being substantially equal to a diameter of the valve retainer body.

9. A valve apparatus, comprising:
a valve retainer body defining a valve seat;
a movable poppet that defines a valve member that is configured to contact the valve seat of the valve retainer body;
a rotatable shaft that is configured to actuate the movable poppet;
a thread formed at an end of the rotatable shaft;
a sealing diaphragm between the movable poppet and the thread;
a sleeve including an internally threaded surface that is engaged with the thread, and including a cylindrical extension; and
a cylindrical spacer surrounding the rotatable shaft at an end of the rotatable shaft that does not include the thread and positioned between cylindrical extension and the rotatable shaft,
wherein rotation of the thread by the rotatable shaft translates the sleeve towards and away from the movable poppet to transfer an axial force to the poppet that forces the valve member into engagement and disengagement with the valve seat to open and close the valve apparatus.

10. The valve apparatus according to claim 9, wherein the sleeve includes an abutment surface configured to contact the poppet and transmit the axial force to the poppet.

11. The valve apparatus according to claim 9, wherein the sleeve includes a first portion configured to be mated with the thread and an axially extending cylindrical portion.

12. The valve apparatus according to claim 9, wherein the valve retainer body includes a first inlet, a second inlet, and an outlet, the first inlet being configured to be in fluid communication with a first fluid and the second inlet being configured to be in fluid communication with a second fluid.

13. The valve apparatus according to claim 12, wherein the first inlet is located on a first side of the valve member and the second inlet is located on a second side of the valve member, the outlet is located between the first inlet and the second inlet, and the first and second fluids intermix when the valve apparatus is open.

14. The valve apparatus according to claim 12, wherein the first fluid and the second fluid each include either a liquid or a gas.

15. The valve apparatus according to claim 9, wherein a diameter of the sealing diaphragm is substantially equal to a diameter of the valve retainer body.

16. The valve apparatus according to claim 9, further comprising a motor for rotating the rotatable shaft and the thread to translate the sleeve towards and away from the movable poppet.

* * * * *